(12) United States Patent
Satoh et al.

(10) Patent No.: US 9,796,634 B2
(45) Date of Patent: Oct. 24, 2017

(54) HOLDING MATERIAL FOR GAS TREATMENT DEVICE, GAS TREATMENT DEVICE, AND PRODUCTION PROCESSES THEREFOR

(71) Applicant: NICHIAS CORPORATION, Tokyo (JP)

(72) Inventors: Junya Satoh, Tokyo (JP); Nobuya Tomosue, Tokyo (JP); Kazutoshi Isomura, Tokyo (JP); Kiyoshi Sato, Tokyo (JP); Tadashi Sakane, Tokyo (JP); Hiroki Nakamura, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 226 days.

(21) Appl. No.: 14/374,066

(22) PCT Filed: Nov. 14, 2012

(86) PCT No.: PCT/JP2012/079564
§ 371 (c)(1),
(2) Date: Jul. 23, 2014

(87) PCT Pub. No.: WO2013/111428
PCT Pub. Date: Aug. 1, 2013

(65) Prior Publication Data
US 2015/0033714 A1  Feb. 5, 2015

(30) Foreign Application Priority Data

Jan. 23, 2012  (JP) .................................. 2012-011304

(51) Int. Cl.
*B01D 50/00* (2006.01)
*C04B 35/76* (2006.01)
(Continued)

(52) U.S. Cl.
CPC ................ *C04B 35/76* (2013.01); *B28B 1/14* (2013.01); *C03C 13/005* (2013.01); *D21H 13/38* (2013.01);
(Continued)

(58) Field of Classification Search
CPC .. F01N 3/2835; F01N 3/0211; F01N 2310/02; B28B 1/14; Y10T 29/49345
(Continued)

(56) References Cited

U.S. PATENT DOCUMENTS 5,032,441 A    7/1991  Ten Eyck et al.
5,290,522 A    3/1994  Rogers et al.
(Continued)

FOREIGN PATENT DOCUMENTS

CN         1329517 A     1/2002
CN         1700950 A    11/2005
(Continued)

OTHER PUBLICATIONS

Jul. 29, 2014 English language version of International Preliminary Report on Patentability issued in International Application No. PCT/JP2012/079564.
(Continued)

*Primary Examiner* — Tom P Duong
(74) *Attorney, Agent, or Firm* — Oliff PLC

(57) ABSTRACT

Provided are a holding material for a gas treatment device, which is inexpensive, has a simple structure, and exhibits high holding force, a gas treatment device, and a method for manufacturing the same. A holding material for a gas treatment device according to the present invention is a holding material, which is a holding material to be arranged, in a gas treatment device including a treatment structure and a casing for housing the treatment structure, between the treatment structure and the casing, the holding material
(Continued)

including silica fibers and an alumina sol in an amount of 3 parts by mass or more in terms of a solid content with respect to 100 parts by mass of the silica fibers.

13 Claims, 5 Drawing Sheets

(51) Int. Cl.
| | |
|---|---|
| *D21H 13/38* | (2006.01) |
| *F01N 3/28* | (2006.01) |
| *B28B 1/14* | (2006.01) |
| *F01N 3/021* | (2006.01) |
| *C03C 13/00* | (2006.01) |

(52) U.S. Cl.
CPC .......... *F01N 3/0211* (2013.01); *F01N 3/2803* (2013.01); *F01N 3/2835* (2013.01); *F01N 3/2853* (2013.01); *F01N 2310/02* (2013.01); *Y02T 10/20* (2013.01); *Y10T 29/49345* (2015.01)

(58) Field of Classification Search
USPC .................................................. 422/179, 180
See application file for complete search history.

(56) References Cited

U.S. PATENT DOCUMENTS

| | | | |
|---|---|---|---|
| 5,523,059 | A | 6/1996 | Langer |
| 6,231,818 | B1 | 5/2001 | TenEyck |
| 2001/0024626 | A1 | 9/2001 | TenEyck |
| 2004/0134172 | A1 | 7/2004 | Kumar et al. |
| 2006/0008395 | A1 | 1/2006 | Ten Eyck et al. |
| 2008/0181831 | A1 | 7/2008 | Okabe |
| 2009/0162256 | A1 | 6/2009 | Ten Eyck et al. |
| 2010/0007094 | A1 | 1/2010 | Goshima et al. |
| 2010/0143212 | A1 | 6/2010 | Sakane et al. |
| 2011/0123417 | A1 | 5/2011 | Ten Eyck et al. |
| 2011/0311404 | A1* | 12/2011 | Creedon ............. C23C 18/1216 422/177 |

FOREIGN PATENT DOCUMENTS

| | | |
|---|---|---|
| CN | 101098744 A | 1/2008 |
| CN | 101715508 A | 5/2010 |
| JP | A-11-509509 | 8/1999 |
| JP | A-2005-194904 | 7/2005 |
| JP | 2008-201125 A | 9/2008 |
| JP | 2010-138760 A | 6/2010 |
| JP | A-2011-038529 | 2/2011 |

OTHER PUBLICATIONS

Feb. 19, 2013 International Search Report issued in International Application No. PCT/JP2012/079564.

* cited by examiner

FIG.6

| INITIAL DENSITY (g/cm³) | EXAMPLE 1-1: SILICA FIBER+ALUMINA SOL (TEMPERATURE: 900°C/700°C, STROKE AMOUNT: 0.2 mm) | | | | | EXAMPLE 1-2: SILICA FIBER+ALUMINA SOL (TEMPERATURE: 300°C/240°C, STROKE AMOUNT: 0.08 mm) | | | | |
|---|---|---|---|---|---|---|---|---|---|---|
| | | SURFACE PRESSURE (kPa) | | | | | SURFACE PRESSURE (kPa) | | | |
| | | NOT ADDED | | ADDED AT 6 PARTS BY MASS | | | NOT ADDED | | ADDED AT 6 PARTS BY MASS | |
| | CYCLE | AT TIME OF COMPRESSION | AT TIME OF EXPANSION | AT TIME OF COMPRESSION | AT TIME OF EXPANSION | CYCLE | AT TIME OF COMPRESSION | AT TIME OF EXPANSION | AT TIME OF COMPRESSION | AT TIME OF EXPANSION |
| 0.3 | 1 | 121 | 44 | 159 | 75 | 1 | 56 | 18 | 116 | 76 |
| | 100 | 116 | 46 | 163 | 77 | 100 | 58 | 23 | 120 | 81 |
| | 500 | 118 | 48 | 163 | 78 | 500 | 60 | 22 | 123 | 82 |
| | 1000 | 118 | 48 | 151 | 65 | 1000 | 59 | 19 | 124 | 82 |
| 0.5 | 1 | 460 | 87 | 737 | 227 | 1 | 232 | 84 | 423 | 250 |
| | 100 | 435 | 102 | 709 | 215 | 100 | 245 | 97 | 450 | 298 |
| | 500 | 447 | 106 | 714 | 218 | 500 | 260 | 101 | 442 | 295 |
| | 1000 | 446 | 104 | 713 | 212 | 1000 | 270 | 100 | 434 | 289 |

FIG.7

EXAMPLE 2: SILICA FIBER+ALUMINA SOL
(TEMPERATURE: 900°C/700°C, STROKE AMOUNT: 0.2 mm)

| INITIAL DENSITY (g/cm³) | CYCLE | SURFACE PRESSURE (kPa) | | | | | | | |
|---|---|---|---|---|---|---|---|---|---|
| | | NOT ADDED | | ADDED AT 6 PARTS BY MASS | | ADDED AT 10 PARTS BY MASS | | ADDED AT 15 PARTS BY MASS | |
| | | AT TIME OF COMPRESSION | AT TIME OF EXPANSION | AT TIME OF COMPRESSION | AT TIME OF EXPANSION | AT TIME OF COMPRESSION | AT TIME OF EXPANSION | AT TIME OF COMPRESSION | AT TIME OF EXPANSION |
| 0.3 | 1000 | 118 | 48 | 151 | 65 | 205 | 84 | 224 | 83 |

FIG.8

| INITIAL DENSITY (g/cm³) | CYCLE | COMPARATIVE EXAMPLE: ALUMINA FIBER+ALUMINA SOL (TEMPERATURE: 900°C/700°C, STROKE AMOUNT: 0.2 mm) | | | | | | | | |
|---|---|---|---|---|---|---|---|---|---|---|
| | | SURFACE PRESSURE (kPa) | | | | | | | | |
| | | NOT ADDED | | ADDED AT 6 PARTS BY MASS | | ADDED AT 10 PARTS BY MASS | | ADDED AT 15 PARTS BY MASS | |
| | | AT TIME OF COMPRESSION | AT TIME OF EXPANSION | AT TIME OF COMPRESSION | AT TIME OF EXPANSION | AT TIME OF COMPRESSION | AT TIME OF EXPANSION | AT TIME OF COMPRESSION | AT TIME OF EXPANSION |
| 0.3 | 1000 | 143 | 46 | 154 | 45 | 157 | 43 | 166 | 50 |

HOLDING MATERIAL FOR GAS TREATMENT DEVICE, GAS TREATMENT DEVICE, AND PRODUCTION PROCESSES THEREFOR

TECHNICAL FIELD

The present invention relates to a holding material for a gas treatment device, a gas treatment device, and a method for manufacturing the same, and more particularly, to improving holding force of a holding material.

BACKGROUND ART

Vehicles such as automobiles are equipped with a catalyst converter for removing harmful substances such as carbon monoxide, hydrocarbons, and nitrogen oxides contained in exhaust gas. An example of the catalyst converter is a converter including a tubular catalyst carrier, a tubular metal casing for housing the tubular catalyst carrier, and a mat-shaped holding material formed of inorganic fibers arranged between the catalyst carrier and the casing.

For such catalyst converter, there have hitherto been attempts to improve holding force of the holding material with a view to stable holding of the catalyst carrier in the metal casing (see, for example, Patent Literature 1).

CITATION LIST

Patent Literature

Patent Literature 1: JP 2005-194904 A

SUMMARY OF INVENTION

Technical Problem

However, in the attempts to improve holding force of the holding material, there have hitherto been problems of an increased cost and/or a more complicated structure.

The present invention has been made in view of the problems described above, and it is thus one of the objects of the present invention to provide a holding material for a gas treatment device, which is inexpensive, has a simple structure, and exhibits high holding force, a gas treatment device, and methods for manufacturing the same.

Solution to Problem

A holding material for a gas treatment device according to an embodiment of the present invention for achieving the above-mentioned object is a holding material for a gas treatment device, which is arranged, in the gas treatment device including a treatment structure and a casing for housing the treatment structure, between the treatment structure and the casing, the holding material including silica fibers and an alumina sol in an amount of 3 parts by mass or more in terms of a solid content with respect to 100 parts by mass of the silica fibers. According to the embodiment of the present invention, a holding material for a gas treatment device, which is inexpensive, has a simple structure, and exhibits high holding force, is provided.

A holding material for a gas treatment device according to an embodiment of the present invention for achieving the above-mentioned object is a holding material for a gas treatment device, which is arranged, in the gas treatment device including a treatment structure and a casing for housing the treatment structure, between the treatment structure and the casing, the holding material including silica fibers and an alumina sol, and the holding material exhibits a surface pressure 1.2 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 700 to 900° C., and a stroke amount of 0.2 mm. According to the embodiment of the present invention, a holding material for a gas treatment device, which is inexpensive, has a simple structure, and exhibits high holding force, is provided.

A holding material for a gas treatment device according to an embodiment of the present invention for achieving the above-mentioned object is a holding material for a gas treatment device, which is arranged, in the gas treatment device including a treatment structure and a casing for housing the treatment structure, between the treatment structure and the casing, the holding material including silica fibers and an alumina sol, and the holding material exhibits a surface pressure 1.5 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 240 to 300° C., and a stroke amount of 0.08 mm. According to the embodiment of the present invention, a holding material for a gas treatment device, which is inexpensive, has a simple structure, and exhibits high holding force, is provided.

A gas treatment device according to an embodiment of the present invention for achieving the above-mentioned object includes: a treatment structure; a casing for housing the treatment structure; and a holding material according to any one of the above-mentioned embodiments arranged between the treatment structure and the casing. According to the embodiment of the present invention, a gas treatment device, which is inexpensive, has a simple structure, and exhibits high holding force, is provided.

A method for manufacturing a holding material for a gas treatment device according to an embodiment of the present invention for achieving the object is a method for manufacturing a holding material for a gas treatment device, which is arranged, in the gas treatment device including a treatment structure and a casing for housing the treatment structure, between the treatment structure and the casing, the method including manufacturing the holding material by wet molding of a slurry including silica fibers and an alumina sol in an amount of 3 parts by mass or more in terms of a solid content with respect to 100 parts by mass of the silica fibers. According to the embodiment of the present invention, a method for manufacturing a holding material for a gas treatment device, which is inexpensive, has a simple structure, and exhibits high holding force, is provided.

A method for manufacturing a holding material for a gas treatment device according to an embodiment of the present invention for achieving the object is a method for manufacturing a holding material for a gas treatment device, which is arranged, in the gas treatment device including a treatment structure and a casing for housing the treatment structure, between the treatment structure and the casing, the method including manufacturing the holding material by wet molding of a slurry including silica fibers and an alumina sol in an amount that allows the holding material to exhibit a surface pressure 1.2 times or more as high as a surface pressure of a holding material free of the alumina sol, at a time of expansion at 1,000th cycle in an expansion/compression test employing an initial bulk density of from 0.3 to 0.5 g/cm³, a temperature of from 700 to 900° C., and a stroke amount of 0.2 mm. According to the embodiment of the present invention, a method for manufacturing a holding material for a gas treatment device, which is inexpensive, has a simple structure, and exhibits high holding force, is provided.

A method for manufacturing a holding material for a gas treatment device according to an embodiment of the present invention for achieving the object is a method for manufacturing a holding material for a gas treatment device, which is arranged, in the gas treatment device including a treatment structure and a casing for housing the treatment structure, between the treatment structure and the casing, the method including manufacturing the holding material by wet molding of a slurry including silica fibers and an alumina sol in an amount that allows the holding material to exhibit a surface pressure 1.5 times or more as high as a surface pressure of a holding material free of the alumina sol, at a time of expansion at 1,000th cycle in an expansion/compression test employing an initial bulk density of from 0.3 to 0.5 g/cm³, a temperature of from 240 to 300° C., and a stroke amount of 0.08 mm. According to the embodiment of the present invention, a method for manufacturing a holding material for a gas treatment device, which is inexpensive, has a simple structure, and exhibits high holding force, is provided.

A method for manufacturing a gas treatment device according to an embodiment of the present invention for achieving the above-mentioned object is a method for manufacturing a gas treatment device including a treatment structure, a casing for housing the treatment structure, and a holding material arranged between the treatment structure and the casing, the method including arranging the holding material according to any one of the above-mentioned embodiments between the treatment structure and the casing. According to the embodiment of the present invention, the method for manufacturing a gas treatment device, which is inexpensive, has a simple structure, and exhibits high holding force, is provided.

Advantageous Effects of Invention

According to embodiments of the present invention, a holding material for a gas treatment device that is inexpensive, has a simple structure, and exhibits high holding force, a gas treatment device, and a method for manufacturing the same is provided.

BRIEF DESCRIPTION OF DRAWINGS

FIG. 6 is an explanatory diagram showing an example of evaluation results of surface pressures of holding materials in Example 1 according to an embodiment of the present invention.

FIG. 7 is an explanatory diagram showing an example of evaluation results of surface pressures of holding materials in Example 2 according to an embodiment of the present invention.

FIG. 8 is an explanatory diagram showing an example of evaluation results of surface pressures of holding materials in Comparative Example.

DESCRIPTION OF EMBODIMENTS

Embodiments of the present invention are hereinafter described. It should be noted that the present invention is not limited to these embodiments.

Figure 1:
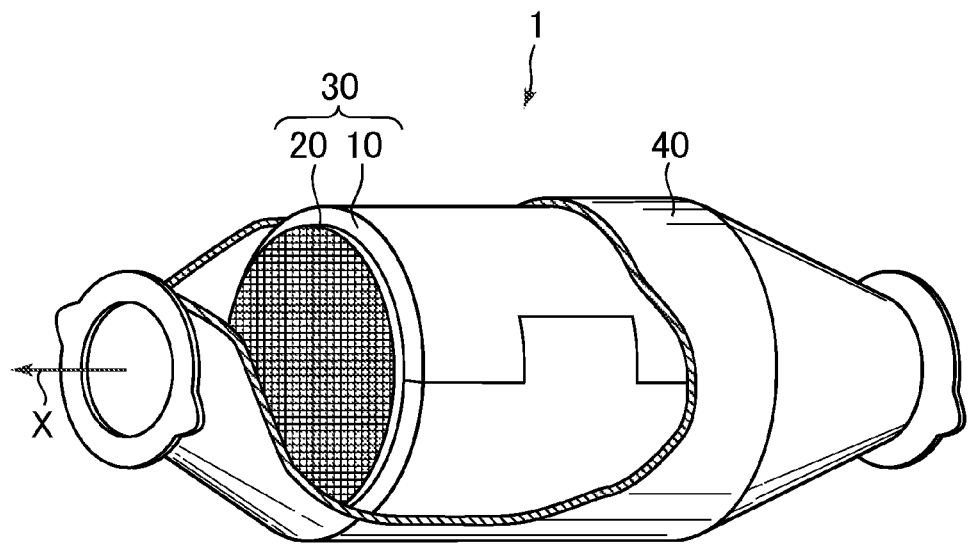
FIG. 1 is an explanatory diagram illustrating an example of a gas treatment device according to an embodiment of the present invention.

FIG. 1 is an explanatory diagram illustrating an example of a gas treatment device 1 according to an embodiment of the present invention. In FIG. 1, for the convenience of illustration, a casing 40 is partially omitted to expose a treatment structure 20 and a holding material 10 that are housed in the casing 40 and thereby illustrate these components.

Figure 2:
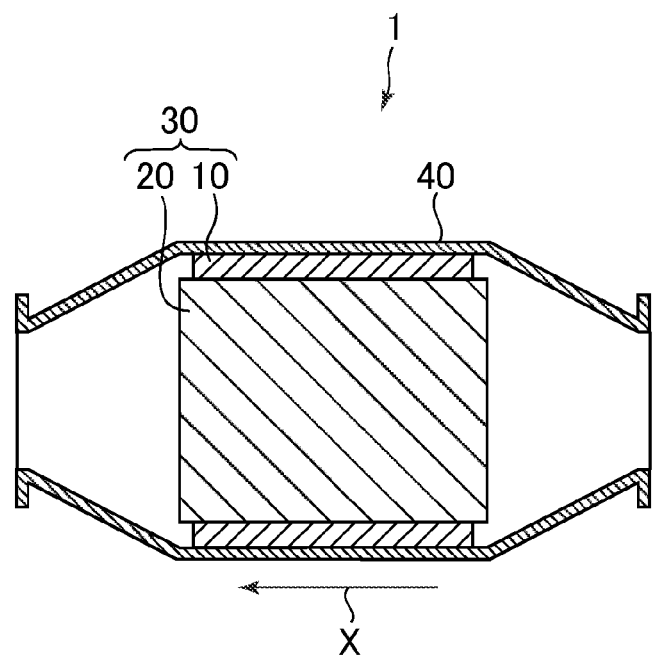
FIG. 2 is an explanatory diagram illustrating an example of a cross section of a gas treatment device according to an embodiment of the present invention taken along the longitudinal direction.

FIG. 2 is an explanatory diagram illustrating an example of a cross section of the gas treatment device 1 taken along the longitudinal direction (the direction indicated by the arrow X in FIGS. 1 and 2). In FIGS. 1 and 2, the arrow X indicates a flow direction of gas in the gas treatment device 1.

Figure 3:
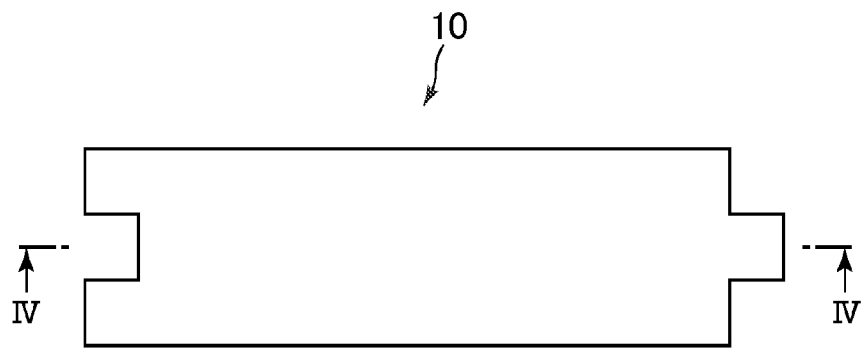
FIG. 3 is an explanatory diagram illustrating an example of a holding material according to an embodiment of the present invention in plane view.
Figure 4:
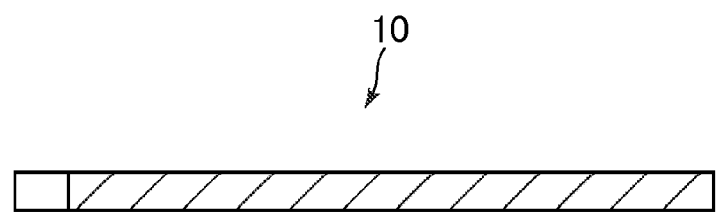
FIG. 4 is an explanatory diagram illustrating an example of a cross section of a holding material taken along the line IV-IV in FIG. 3.

FIG. 3 is an explanatory diagram illustrating an example of the holding material 10 for a gas treatment device according to the embodiment of the present invention in plane view. FIG. 4 is an explanatory diagram illustrating an example of a cross section of the holding material 10 taken along the line IV-IV in FIG. 3.

As illustrated in FIGS. 1 and 2, the gas treatment device 1 includes the treatment structure 20, the casing 40 for housing the treatment structure 20, and the holding material 10 arranged between the treatment structure 20 and the casing 40.

The gas treatment device 1 is used for treating gas, for example, for purifying gas. Specifically, an example of the gas treatment device 1 is an exhaust gas treatment device to be used for purifying exhaust gas. That is, the gas treatment device 1 is provided in, for example, vehicles such as automobiles with a view to treating harmful substances and/or particles contained in exhaust gas discharged from an internal-combustion engine (gasoline engine, diesel engine, or the like). In this case, the temperature of the gas flowing in the gas treatment device 1 is not particularly limited, but is from 200 to 950° C., for example.

In the example illustrated in FIGS. 1 and 2, the gas treatment device 1 is a catalyst converter to be used for removing harmful substances contained in exhaust gas discharged from a gasoline engine in vehicles such as automobiles. It should be noted that the gas treatment device 1 may be, for example, a diesel particulate filter (DPF) to be used for removing particles contained in exhaust gas discharged from a diesel engine.

The treatment structure 20 is a structure having a function of treating gas. Specifically, in a case where the gas treatment device 1 is a catalyst converter, the treatment structure 20 is a catalyst carrier including a catalyst for purifying gas and a carrier for supporting the catalyst, as illustrated in the examples of FIGS. 1 and 2.

In this case, an example of the catalyst is a catalyst for removing harmful substances (carbon monoxide, hydrocarbons, nitrogen oxides, and the like) contained in gas such as exhaust gas. A more specific example of the catalyst is a metal catalyst such as a noble metal catalyst. An example of the carrier for supporting the catalyst is a tubular molded body (for example, a cylindrically-shaped honeycomb molded body) formed of an inorganic material such as ceramics (cordierite or the like).

In a case where the gas treatment device 1 is a device for removing particles contained in gas, such as DPF, the treatment structure 20 is a structure including a filter for trapping the particles in the gas. In this case, the treatment structure 20 needs not include a catalyst.

The casing 40 is a tubular body having a space formed in the inside thereof that can house the treatment structure 20. The casing 40 is formed of a metal, for example. The metal constituting the casing 40 is not particularly limited, but for example, selected from the group consisting of stainless steel, iron, and aluminum.

The casing 40 may be a tubular body separable into two sections along the longitudinal direction of the gas treatment device 1, or may be an integrated tubular body that is not separable. In the examples illustrated in FIGS. 1 and 2, the casing 40 is an integrated tubular body.

The holding material 10 is used for holding the treatment structure 20 in the casing 40. Specifically, the holding material 10 is pressed into a gap between the casing 40 and the treatment structure 20 and thereby holds the treatment structure 20 in the casing 40 stably.

For example, the holding material 10 is required to have the following functions in combination: a function of securely holding the treatment structure 20 so as to prevent the treatment structure 20 from colliding with the casing 40 and breaking owing to vibration or the like in the gas treatment device 1; and a function of sealing the gap between the treatment structure 20 and the casing 40 so as to prevent unpurified gas from leaking downstream through the gap.

The holding material 10 is used for the gas treatment device 1 provided for, for example, treating harmful substances contained in exhaust gas discharged from an internal-combustion engine in vehicles such as automobiles. Specifically, the holding material 10 may be used, for example, under environments of relatively high temperatures (800 to 950° C.) such as in a gasoline engine or under environments of relatively low temperatures (500 to 700° C.) such as in a diesel engine (for example, DPF).

Now, one feature of the embodiment of the present invention is that the holding material 10 is formed of silica fibers. That is, the holding material 10 is a molded body formed mainly of silica fibers. Specifically, the holding material 10 may be, for example, a molded body including silica fibers at a content of 85 mass % or more, 90 mass % or more, or 95 mass % or more. The upper limit of the content of the silica fibers in the holding material 10 is not particularly limited as long as the holding material 10 includes an alumina sol in an amount described later, but the content of the silica fibers may be, for example, 97 mass % or less.

The silica fibers are inorganic fibers including silica ($SiO_2$) as a main component. The silica fibers may be amorphous fibers or crystalline fibers. In particular, amorphous fibers are preferred because such fibers have excellent flexibility. For example, the silica fibers may include silica at a content of 90 mass % or more, 95 mass % or more, or 97 mass % or more. The upper limit of the content of silica in the silica fibers is not particularly limited, but the content of silica may be, for example, 99 mass % or less.

The silica fibers may further include a component other than silica. Specifically, the silica fibers may further include alumina ($Al_2O_3$), for example. In this case, the silica fibers may include alumina at a content of, for example, 3 mass % or less. That is, the content of alumina in the silica fibers may be, for example, from 0 to 3 mass %, or from 1 to 3 mass %.

As the silica fibers, silica fibers preliminarily subjected to heat treatment (calcination treatment) may be used. Preliminarily heat treating silica fibers brings about improvement in heat resistance of the silica fibers.

Specifically, the silica fibers may be, for example, silica fibers including a silica component at a high content prepared by removing an alkali component from glass fibers through acid treatment. By preliminarily heat treating such silica fibers after acid treatment, fine pores generated through the acid treatment in production steps of the silica fibers are filled by thermal contraction of the silica fibers, which results in improvement in heat resistance of the silica fibers.

The average fiber diameter of the silica fibers is, for example, preferably from 5 to 8 μm. The average fiber length of the silica fibers is, for example, preferably from 4 to 15 mm.

Now, another feature of the embodiment of the present invention is that the holding material 10 includes an alumina sol in a relatively large amount. That is, as a result of a diligent study on technical means for improving holding force of a holding material formed of inorganic fibers by the inventors of the present invention, there has been surprisingly a unique finding that using silica fibers as the inorganic fibers, which have not frequently been used for a holding material hitherto, and using an alumina sol in a relatively large amount (for example, in an amount that has not been employed for use as an inorganic binder hitherto) with respect to the silica fibers significantly improve the holding force of the holding material. The present invention has been completed based on the finding.

Specifically, the holding material 10 is formed of silica fibers and includes an alumina sol, and for example, may exhibit a surface pressure 1.2 times or more or 1.3 times or more as high as a surface pressure of a holding material free of the alumina sol, at a time of expansion at 1,000th cycle in an expansion/compression test employing an initial bulk density of from 0.3 to 0.5 $g/cm^3$, a temperature of from 700 to 900° C., and a stroke amount of 0.2 mm.

The holding material 10, for example, may exhibit a surface pressure 1.5 times or more or twice or more as high as a surface pressure of a holding material free of the alumina sol, at a time of expansion at 1,000th cycle in an expansion/compression test employing an initial bulk density of from 0.3 to 0.5 $g/cm^3$, a temperature of from 240 to 300° C., and a stroke amount of 0.08 mm.

It should be noted that, in each of those expansion/compression tests, the bulk density of the holding material 10 before the test is lower than the initial bulk density in the test. Specifically, in the expansion/compression test, the holding material 10 having a bulk density of, for example, from 0.1 to 0.2 $g/cm^3$ may be used after compressed to have an initial bulk density (bulk density at the start of the first cycle in the test) of from 0.3 to 0.5 $g/cm^3$.

The holding material 10 includes the alumina sol in an amount that brings about the surface pressure described above. For example, the amount of the alumina sol in the holding material 10 may be determined as described below.

A plurality of candidate holding materials including the alumina sol at different contents (a plurality of holding materials having the same structure except for different alumina sol contents) are manufactured. Then, each candidate holding material was evaluated for the surface pressure in the expansion/compression test described above. Finally, the content of the alumina sol is determined based on the evaluation results. Specifically, the content of the alumina sol is determined based on the alumina sol content of a candidate holding material that exhibits a surface pressure a predetermined times or more as high as a surface pressure of a comparative holding material free of the alumina sol (a holding material having the same structure except for not including the alumina sol) at a time of expansion at 1,000th cycle.

Specifically, the holding material 10 may include the alumina sol in an amount of, for example, 3 parts by mass or more or 4 parts by mass or more in terms of a solid content with respect to 100 parts by mass of the silica fibers.

The upper limit of the content of the alumina sol is not particularly limited as long as the holding material 10 has desired characteristics (for example, as long as the holding material 10 exhibits a surface pressure described above), but the holding material 10 may include the alumina sol in an amount of, for example, 15 parts by mass or less or 10 parts by mass or less in terms of a solid content with respect to 100 parts by mass of the silica fibers.

That is, the holding material 10 may include the alumina sol in an amount of, for example, from 3 to 15 parts by mass or from 3 to 10 parts by mass in terms of a solid content with respect to 100 parts by mass of the silica fibers. Alternatively, the holding material 10 may include the alumina sol in an amount of, for example, from 4 to 15 parts by mass or from 4 to 10 parts by mass in terms of a solid content with respect to 100 parts by mass of the silica fibers.

The alumina sol is not particularly limited as long as it is flowable liquid including alumina fine particles dispersed in a solvent (for example, a solvent including water). The alumina sol is produced by, for example, adding an aqueous solution of aluminum sulfate to an aqueous solution of sodium aluminate to neutralize the solution and then adding an acid to the resultant aggregates to disperse the aggregates.

The holding material 10 may further include a component other than the silica fibers and the alumina sol. Specifically, the holding material 10 may further include an organic binder, for example. The organic binder is not particularly limited, but for example, there may be used one or more kinds selected from the group consisting of rubbers, water-soluble organic polymer compounds, thermoplastic resins, and thermosetting resins.

The content of the organic binder in the holding material 10 is not particularly limited, but for example, may be 10 mass % or less (from 0 to 10 mass %) in terms of a solid content with respect to 100 parts by mass of the silica fibers.

The bulk density of the holding material 10 is not particularly limited because the bulk density may be arbitrarily set so as to fall within a desired range in a state in which the holding material 10 is incorporated in the gas treatment device 1 (specifically, in a state in which the holding material 10 is pressed into the gap between the treatment structure 20 and the casing 40).

Specifically, the bulk density of the holding material 10 is arbitrarily set, for example, in accordance with the gap between the treatment structure 20 and the casing 40. Specifically, the bulk density of the holding material 10 may be, for example, from 0.1 to 0.2 g/cm$^3$. Further, the bulk density of the holding material 10 after incorporated in the gas treatment device 1 may be, for example, from 0.2 to 0.7 g/cm$^3$.

Similarly, the basis weight of the holding material 10 is not particularly limited because the basis weight may be arbitrarily set so as to fall within a desired range in a state in which the holding material 10 is incorporated in the gas treatment device 1. Specifically, the basis weight of the holding material 10 may be, for example, from 1,000 to 3,400 g/m$^2$.

The shape of the holding material 10 is not particularly limited as long as the treatment structure 20 is held in the casing 40, but the holding material 10 may be, for example, a plate-like body (a film, a sheet, a blanket, a mat, or the like) or a tubular body. In the examples illustrated in FIGS. 1 to 4, the holding material 10 is a plate-like body.

In a case where the holding material 10 is a plate-like body, one end and the other end of the plate-like body may be formed into shapes corresponding to each other that is fitted to each other. Specifically, in the example illustrated in FIG. 3, one end and the other end of the holding material 10 are formed into a convex shape and a concave shape corresponding to each other, respectively. Further, as illustrated in FIG. 1, the one end and the other end of the holding material 10 arranged on an outer periphery of the treatment structure 20 are fitted to each other.

The holding material 10 may be manufactured preferably by wet molding of a slurry including the silica fibers and the alumina sol in an amount describe above.

Specifically, the holding material 10 may be manufactured by, for example, wet molding of a slurry including the silica fibers and the alumina sol in an amount that allows the holding material 10 to exhibit a surface pressure 1.2 times or more or 1.3 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 700 to 900° C., and a stroke amount of 0.2 mm.

Further, the holding material 10 may be manufactured by, for example, wet molding of a slurry including the silica fibers and the alumina sol in an amount that allows the holding material 10 to exhibit a surface pressure 1.5 times or more or twice or more as high as a surface pressure of a holding material free of the alumina sol, at a time of expansion at 1,000th cycle in an expansion/compression test employing an initial bulk density of from 0.3 to 0.5 g/cm$^3$, a temperature of from 240 to 300° C., and a stroke amount of 0.08 mm.

Further, the holding material 10 may be manufactured by, for example, wet molding of a slurry including the silica fibers and the alumina sol in an amount of 3 parts by mass or more or 4 parts by mass or more in terms of a solid content with respect to 100 parts by mass of the silica fibers.

In this case, the upper limit of the content of the alumina sol in the slurry is not particularly limited as long as the holding material 10 has desired characteristics (for example, as long as the holding material 10 exhibits the surface pressure described above), but the slurry may include the alumina sol in an amount of, for example, 15 parts by mass or less or 10 parts by mass or less in terms of a solid content with respect to 100 parts by mass of the silica fibers.

Specifically, the slurry may include the alumina sol in an amount of, for example, from 3 to 15 parts by mass or from 3 to 10 parts by mass in terms of a solid content with respect to 100 parts by mass of the silica fibers. Alternatively, the slurry may include the alumina sol in an amount of, for example, from 4 to 15 parts by mass or from 4 to 10 parts by mass in terms of a solid content with respect to 100 parts by mass of the silica fibers.

The wet molding of the slurry begins with pouring the aqueous slurry including at least the silica fibers and the alumina sol constituting the holding material 10 into a mold for dewatering molding having a predetermined shape. Then, dewatering molding is carried out to produce a molded body (wet molded body) formed of silica fibers having a shape corresponding to the shape of the mold. Further, the resultant wet molded body is compressed so that the characteristics such as the bulk density and/or basis weight fall within desired ranges, followed by drying. Finally, the holding material 10 formed of the silica fibers is obtained.

It should be noted that the mold for dewatering molding is not particularly limited as long as the mold has a structure allowing a water component in the aqueous slurry to pass therethrough and allowing constituent materials for the holding material 10, such as the silica fibers and the alumina sol, to remain in the mold, but for example, a mold including a metal mesh or a plate having a plurality of fine holes formed therein can be preferably used.

The gas treatment device 1 is assembled by arranging the treatment structure 20 and the holding material 10 in the casing 40. Specifically, the gas treatment device 1 is manufactured by a method including arranging the holding material 10 described above between the treatment structure 20 and the casing 40.

Specifically, the holding material 10 is, for example, first arranged on an outer periphery of the treatment structure 20 to produce an assembly 30 including the treatment structure 20 and the holding material 10 (see FIGS. 1 and 2). Then, the assembly 30 is arranged in the casing 40.

It should be noted that, in a case where the holding material 10 has a plate shape, the assembly 30 is produced by wrapping the holding material 10 around the outer periphery of the treatment structure 20. Alternatively, in a case where the holding material 10 has a tubular shape, the assembly 30 is produced by inserting the treatment structure 20 into the cavity of the holding material 10.

Further, in a case where the casing 40 is an integrated body that is not separable, the assembly 30 is pressed into the casing 40 through an opening at one end of the casing 40 in the longitudinal direction (a so-called stuffing system).

Meanwhile, in a case where the casing 40 is separable, the assembly 30 is sandwiched between one part and another part of the casing 40 separated and then the casing 40 is integrated (a so-called clam shell system). The integration is carried out by, for example, using a tightening member such as a bolt and a nut and/or welding.

Now, in using the gas treatment device 1, gas is allowed to flow in the inside of the gas treatment device 1 to be purified. Specifically, in the gas treatment device 1, gas flows in through one end thereof in the longitudinal direction, is purified while passing through the treatment structure 20, and finally, flows out through the other end thereof in the longitudinal direction.

More specifically, in the gas treatment device 1 illustrated in FIGS. 1 and 2, which is a catalyst converter, gas such as exhaust gas flows in through one end of the casing 40 along the direction indicated by the arrow X and then is purified by a catalyst contained in the treatment structure 20 serving as a catalyst carrier. The purified gas flows out of the gas treatment device 1 through the other end of the casing 40.

It should be noted that the one end and the other end of the gas treatment device 1 arranged in vehicles such as automobiles are connected to a pipe for introducing gas such as exhaust gas from an upstream side to the gas treatment device 1 and a pipe for introducing purified gas from the gas treatment device 1 to a downstream side, respectively.

Next, specific examples according to the embodiments of the present invention are described.

Example 1

[Manufacture of Holding Material]

A holding material 10 formed of silica fibers including an alumina sol was manufactured by wet molding (dewatering molding). Specifically, first, there was prepared an aqueous slurry that included 100 parts by mass of silica fibers (silica: 97 mass %, alumina: 3 mass %), 6 parts by mass of an alumina sol in terms of a solid content (30 parts by mass of a commercially available alumina sol having a solid content of 20 mass % (AS520 manufactured by Nissan Chemical Industries, Ltd.)), and 0.6 part by mass of an organic binder (an acrylic resin), and was adjusted to have a solid content concentration of 0.8 mass % through dilution with water.

Next, the aqueous slurry was poured into a mold for dewatering molding including a metal mesh, and then dewatering molding was performed to obtain a wet molded body. In addition, the whole of the wet molded body was dried at 100° C. while compressed to have a uniform thickness. Thus, there were obtained a first holding material 10 of a mat shape (1,200 mm×700 mm×9.5 mm) including 6 parts by mass of the alumina sol in terms of a solid content with respect to 100 parts by mass of the silica fibers and having a basis weight of 1,200 g/m$^2$ and a bulk density of 0.126 g/cm$^3$ and a second holding material 10 of a mat shape (1,200 mm×700 mm×15.4 mm) including 6 parts by mass of the alumina sol in terms of a solid content with respect to 100 parts by mass of the silica fibers and having a basis weight of 2,000 g/m$^2$ and a bulk density of 0.130 g/cm$^3$.

[Evaluation of Surface Pressure]

Figure 5:
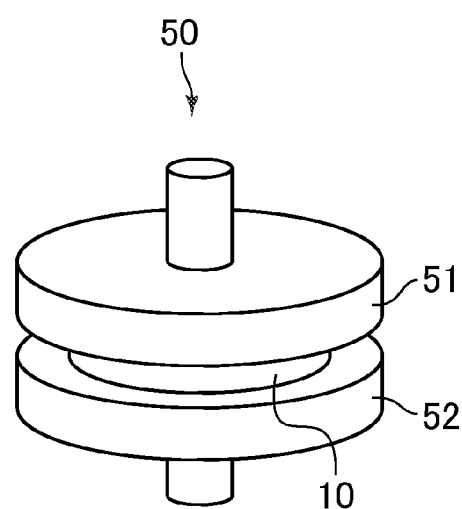
FIG. 5 is an explanatory diagram schematically illustrating a testing device used in Example according to an embodiment of the present invention.

The surface pressures of the two kinds of holding materials 10 were evaluated by using a testing device 50 illustrated in FIG. 5. Specifically, the testing device 50 included a first compression jig 51 (a member corresponding to the treatment structure 20 such as a catalyst carrier) that was a circular plate (diameter: 100 mm, thickness: 30 mm) formed of Inconel (trademark) and a second compression jig 52 (a member corresponding to the casing 40) that was a circular plate (diameter: 100 mm, thickness: 30 mm) formed of Inconel (trademark), the second compression jig 52 being arranged facing the first compression jig 51.

By using such device, any one of the two kinds of holding materials 10 was sandwiched between the first compression jig 51 and the second compression jig 52 and held therebetween, as illustrated in FIG. 5. On this occasion, the distance between the first compression jig 51 and the second compression jig 52 was adjusted to 4 mm. That is, the bulk density of the first holding material 10 was adjusted to 0.3 g/cm$^3$ by compressing the first holding material 10 or the bulk density of the second holding material 10 was adjusted to 0.5 g/cm$^3$ by compressing the second holding material 10.

As Example 1-1, an expansion/compression test was performed at a temperature of from 700 to 900° C. and a stroke amount of 0.2 mm, which corresponded to a case where a metal casing repeatedly expanded and contracted at a rate of thermal expansion of 5% in use of a gasoline engine.

Specifically, a cycle in which the distance between the first compression jig 51 and the second compression jig 52 was increased by 0.2 mm (expansion) and then decreased by 0.2 mm (compression) was repeated 1,000 times while the temperatures of the first compression jig 51 and the second compression jig 52 were kept at 900° C. and 700° C., respectively. It should be noted that, during the 1,000 cycles, the temperatures of the first compression jig 51 and the second compression jig 52 were kept at 900° C. and 700° C., respectively.

In this case, a repulsion force acting on the first compression jig 51 from the holding material 10 held in the testing device 50 was measured as the surface pressure (kPa) at the time of compression and expansion in each cycle. That is, for example, when a repulsion force N (kPa) was measured for the first compression jig 51, the repulsion force N (kPa) was directly taken as the surface pressure.

In addition, as Example 1-2, an expansion/compression test was performed at a temperature of from 240 to 300° C. and a stroke amount of 0.08 mm, which corresponded to a case where a metal casing repeatedly expanded and contracted at a rate of thermal expansion of 2% in use of a diesel engine.

Specifically, a cycle in which the distance between the first jig 51 and the second jig 52 was increased by 0.08 mm (expansion) and then decreased by 0.08 mm (compression) was repeated 1,000 times while the temperatures of the first jig 51 and the second jig 52 were kept at 300° C. and 240° C., respectively.

In this case, a repulsion force acting on the first compression jig 51 from the holding material 10 held in the testing device 50 was measured as the surface pressure (kPa) at the time of compression and expansion in each cycle. That is, for example, when a repulsion force N (kPa) was measured for the first compression jig 51, the repulsion force N (kPa) was directly taken as the surface pressure.

Further, for comparison, wet molding of an aqueous slurry was performed in the same manner as above except that the aqueous slurry did not include an alumina sol. Thus, a first comparative holding material of a mat shape (1,200 mm×700 mm×9.5 mm) having a basis weight of 1,200 g/m$^2$ and a bulk density of 0.126 g/cm$^3$ and a second comparative holding material of a mat shape (1,200 mm×700 mm×15.4 mm) having a basis weight of 2,000 g/m$^2$ and a bulk density of 0.130 g/cm$^3$ were manufactured. Then, the surface pressures of the comparative holding materials were evaluated in the same manner as above except that the comparative holding materials were used instead of the holding materials 10 described above.

[Results]

FIG. 6 shows the results of the evaluation of the surface pressure. Specifically, FIG. 6 shows the surface pressure (kPa) of the holding material 10 including the alumina sol ("added at 6 parts by mass") and the comparative holding material free of the alumina sol ("not added") in Example 1-1 and Example 1-2 at the time of expansion and compression at 1st cycle, 100th cycle, 500th cycle, and 1,000th cycle for both cases of having an initial bulk density ("initial density") of 0.3 g/cm$^3$ and 0.5 g/cm$^3$.

As shown in FIG. 6, the holding material 10 including the alumina sol had a remarkably higher surface pressure than the comparative holding material free of the alumina sol at all time points of expansion and compression at 1st cycle, 100th cycle, 500th cycle, and 1,000th cycle in Example 1-1 and Example 1-2. Further, the surface pressure of the holding material 10 including the alumina sol was kept high over 1 to 1,000 cycles.

Example 2

[Manufacture of Holding Material]

A holding material 10 formed of silica fibers including an alumina sol was manufactured in the same manner as that in the case of the first holding material 10 in Example 1 described above except that the content of the alumina sol was 10 parts by mass or 15 parts by mass.

Specifically, a holding material 10 of a mat shape (1,200 mm×700 mm×9.5 mm) including 10 parts by mass or 15 parts by mass of the alumina sol in terms of a solid content with respect to 100 parts by mass of the silica fibers and having a basis weight of 1,200 g/m$^2$ and a bulk density of 0.126 g/cm$^3$ was manufactured by the same wet molding as that in the case of the first holding material 10 described above.

[Evaluation of Surface Pressure]

The surface pressures were evaluated in the same manner as that in Example 1 described above. Specifically, any one of the two kinds of holding materials 10 having different alumina sol contents was sandwiched between the first compression jig 51 and the second compression jig 52 and held therebetween, as illustrated in FIG. 5. On this occasion, the bulk density of the holding material 10 was adjusted to 0.3 g/cm$^3$ by adjusting the distance between the first compression jig 51 and the second compression jig 52 to 4 mm and thereby compressing the holding material 10.

Then, an expansion/compression test was performed for 1,000 cycles at a temperature of from 700 to 900° C. and a stroke amount of 0.2 mm, which corresponded to a case where a metal casing repeatedly expanded and contracted at a rate of thermal expansion of 5% in use of a gasoline engine.

[Results]

FIG. 7 shows the results of the evaluation of the surface pressure. Specifically, FIG. 7 shows the surface pressure (kPa) of the holding material 10 including 10 parts by mass or 15 parts by mass of the alumina sol at the time of expansion and compression at 1,000th cycle. It should be noted that FIG. 7 also shows the results of the holding material 10 including 6 parts by mass of the alumina sol and the comparative holding material free of the alumina sol measured in Example 1-1 described above (the results at 1,000th cycle in the case of an initial density of 0.3 g/cm$^3$ in Example 1-1 shown in FIG. 6).

As shown in FIG. 7, each of the holding material 10 including 10 parts by mass of the alumina sol and the holding material 10 including 15 parts by mass of the alumina sol had a remarkably higher surface pressure than the comparative holding material free of the alumina sol.

Comparative Example

A holding material formed of alumina fibers including an alumina sol was manufactured in the same manner as those in Examples 1 and 2 described above except that alumina fibers were used instead of the silica fibers, and the surface pressure of the holding material was evaluated.

Specifically, a holding material of a mat shape (1,200 mm×700 mm×9.2 mm) including 6 parts by mass, 10 parts by mass, or 15 parts by mass of an alumina sol in terms of a solid content with respect to 100 parts by mass of alumina fibers (alumina: 96 mass %, silica: 4 mass %) and having a basis weight of 1,200 g/m$^2$ and a bulk density of 0.130 g/cm$^3$ was manufactured by the same wet molding as that in Examples 1 and 2 described above. In addition, a holding material formed of alumina fibers free of an alumina sol was manufactured in the same manner except that the alumina sol was not included. Then, the surface pressures were evaluated in the same manner as those in Examples 1 and 2 described above.

FIG. 8 shows the results of the evaluation of the surface pressure. As shown in FIG. 8, the holding material formed of alumina fibers including the alumina sol had a comparable surface pressure to the holding material formed of alumina fibers free of an alumina sol.

The invention claimed is:

1. A holding material for a gas treatment device, which is arranged, in the gas treatment device comprising a treatment structure and a casing for housing the treatment structure, between the treatment structure and the casing,
the holding material comprising silica fibers at a content of 85 mass % or more with respect to the total mass of the holding material and an alumina sol in an amount of 3 parts by mass or more in terms of a solid content with respect to 100 parts by mass of the silica fibers,
wherein a content of alumina in the silica fibers is from 0 to 3 mass % with respect to the total mass of the silica fiber.

2. The holding material for a gas treatment device according to claim 1, wherein the holding material exhibits a surface pressure 1.2 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 700 to 900° C., and a stroke amount of 0.2 mm.

3. A gas treatment device, comprising:
a treatment structure;
a casing for housing the treatment structure; and
a holding material according to claim 2 arranged between the treatment structure and the casing.

4. A method for manufacturing a gas treatment device comprising a treatment structure, a casing for housing the treatment structure, and a holding material arranged between the treatment structure and the casing,
the method comprising arranging the holding material according to claim 2 between the treatment structure and the casing.

5. The holding material for a gas treatment device according to claim 1, wherein the holding material exhibits a surface pressure 1.5 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 240 to 300° C., and a stroke amount of 0.08 mm.

6. A gas treatment device, comprising:
a treatment structure;
a casing for housing the treatment structure; and
a holding material according to claim 5 arranged between the treatment structure and the casing.

7. A method for manufacturing a gas treatment device comprising a treatment structure, a casing for housing the treatment structure, and a holding material arranged between the treatment structure and the casing,
the method comprising arranging the holding material according to claim 5 between the treatment structure and the casing.

8. A gas treatment device, comprising:
a treatment structure;
a casing for housing the treatment structure; and
a holding material according to claim 1 arranged between the treatment structure and the casing.

9. A method for manufacturing a gas treatment device comprising a treatment structure, a casing for housing the treatment structure, and a holding material arranged between the treatment structure and the casing,
the method comprising arranging the holding material according to claim 1 between the treatment structure and the casing.

10. The holding material for a gas treatment device according to claim 1, wherein the content of alumina in the silica fibers is from 1 to 3 mass % with respect to the total mass of the silica fiber.

11. A method for manufacturing a holding material for a gas treatment device, which is arranged, in the gas treatment device comprising a treatment structure and a casing for housing the treatment structure, between the treatment structure and the casing,
the method comprising manufacturing the holding material by wet molding of a slurry comprising silica fibers at a content of 85 mass % or more with respect to the total mass of the holding material and an alumina sol in an amount of 3 parts by mass or more in terms of a solid content with respect to 100 parts by mass of the silica fibers,
wherein a content of alumina in the silica fibers is from 0 to 3 mass % with respect to the total mass of the silica fiber.

12. The method for manufacturing a holding material for a gas treatment device according to claim 11, wherein the holding material is manufactured, and exhibits a surface pressure 1.2 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 700 to 900° C., and a stroke amount of 0.2 mm.

13. The method for manufacturing a holding material for a gas treatment device according to claim 11, wherein, the holding material is manufactured, and exhibits a surface pressure 1.5 times or more as high as a surface pressure of a holding material free of the alumina sol, at a time of expansion at 1,000th cycle in an expansion/compression test employing an initial bulk density of from 0.3 to 0.5 g/cm$^3$, a temperature of from 240 to 300° C., and a stroke amount of 0.08 mm.

* * * * *